Oct. 31, 1961
F. McDOWELL
3,006,131
PNEUMATIC BERRY STRIPPER
Filed Oct. 18, 1960
2 Sheets-Sheet 1
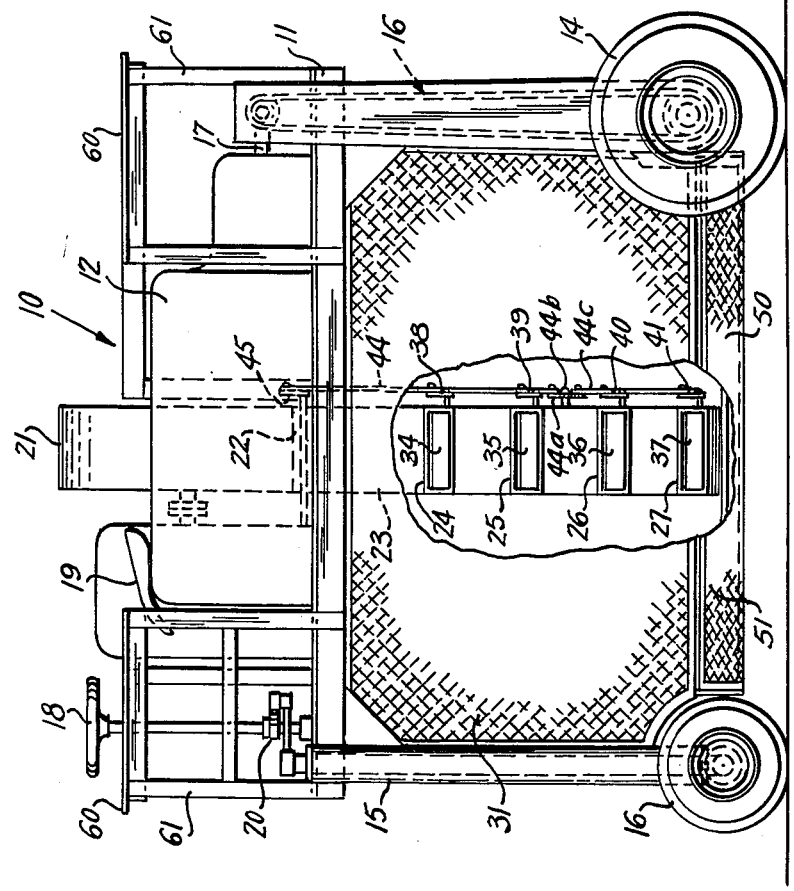
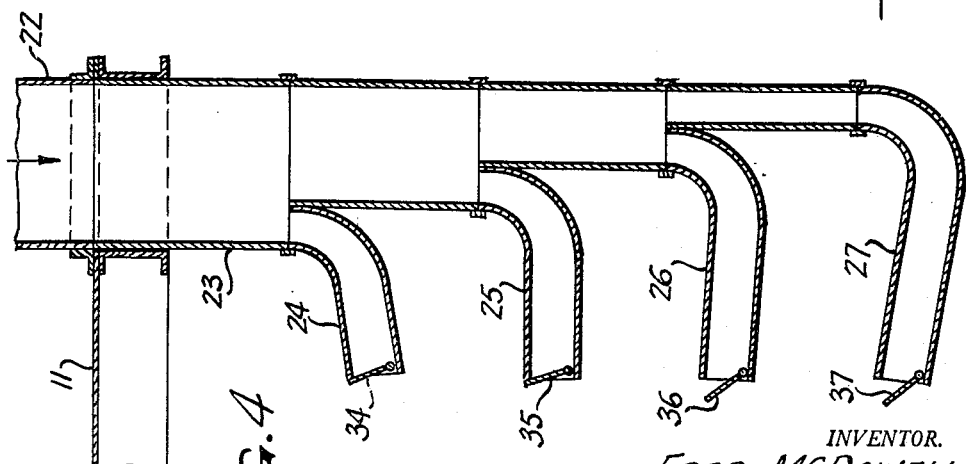
INVENTOR.
FRED McDOWELL
BY Kimmel & Crowell
ATTORNEYS.

Oct. 31, 1961  F. McDOWELL  3,006,131
PNEUMATIC BERRY STRIPPER
Filed Oct. 18, 1960  2 Sheets-Sheet 2
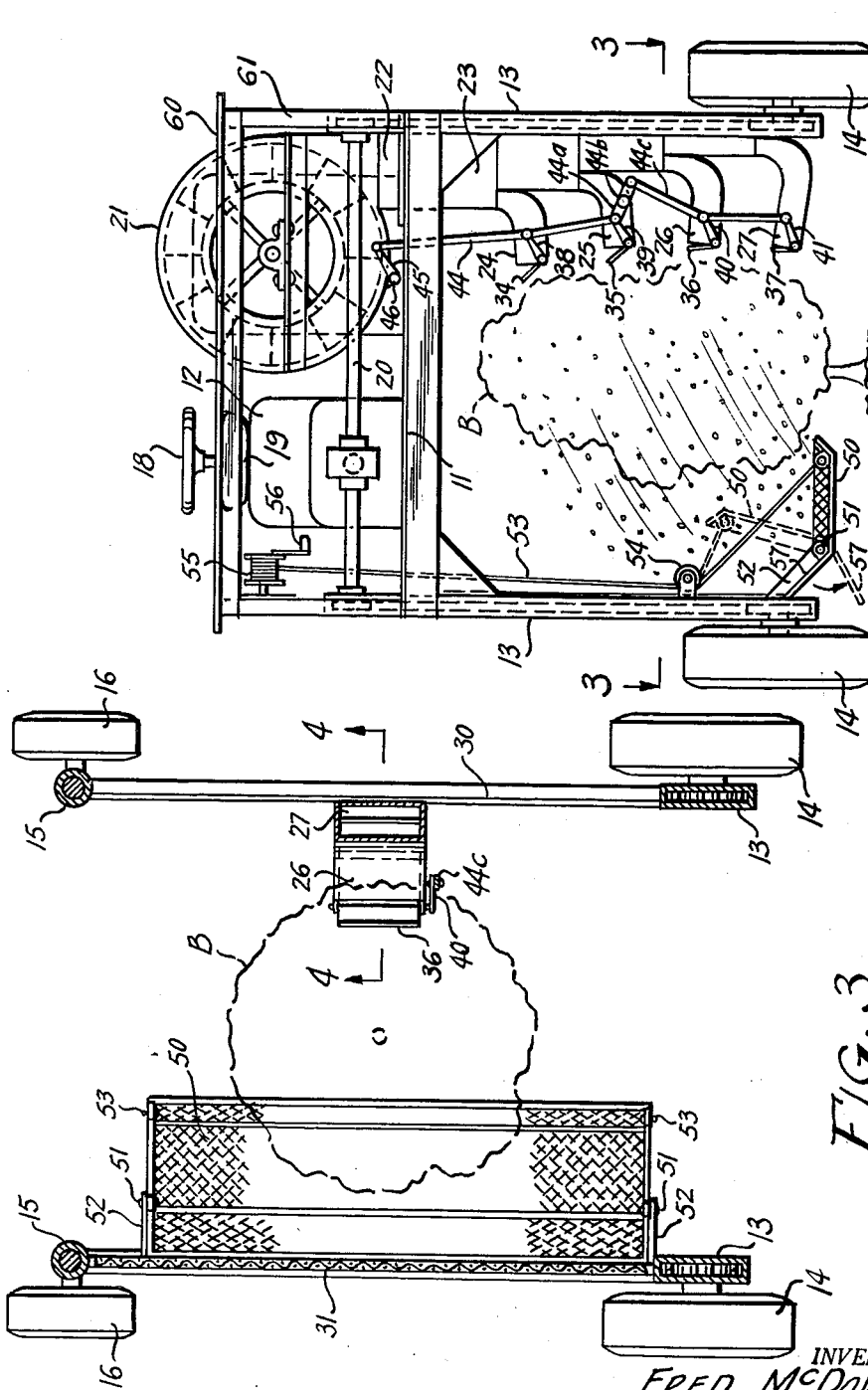
INVENTOR.
FRED McDOWELL
BY Kimmel & Crowell
ATTORNEYS.

United States Patent Office 3,006,131
Patented Oct. 31, 1961

3,006,131
PNEUMATIC BERRY STRIPPER
Fred McDowell, 1815 6th Ave., Neptune, N.J.
Filed Oct. 18, 1960, Ser. No. 63,390
5 Claims. (Cl. 56—330)

This invention relates to a berry picking machine, and comprises an improvement over the berry picking machine disclosed in my Patent No. 2,660,021 issued November 24, 1953.

A primary object of this invention is the provision of an improved berry picking machine characterized by a frame adapted to straddle a plant or row of plants wherein the berries, such as blueberries or the like, are removed from the bushes or plants by means of a pulsating current of air.

An additional object of the invention is the provision of a device of this character wherein air is applied intermittently to the bushes from a plurality of vertically arranged ducts, wherein the air may be supplied by all of the ducts simultaneously in intermittent blasts, or where the ducts may be selectively opened and closed to provide air intermittently at different times to different portions of the bush resulting in a shaking effect.

A further object of the invention is the provision of a device of this character incorporating an improved basket of wire netting or the like for retrieving the berries shaken from the bush by means of the intermittent air blasts.

Still other objects of the invention reside in the combinations of elements, arrangements of parts, and features of construction.

Other objects will in part be obvious and in part be pointed out as the description of the invention proceeds as shown in the accompanying drawing wherein:

FIGURE 1 is a side elevational view with parts broken away showing one form of device embodying features of the instant inventive concept.

FIGURE 2 is a rear elevational view of the device as viewed from the left in FIG. 1.

FIGURE 3 is an enlarged sectional view taken substantially along the line 3—3 of FIG. 2 as viewed in the direction indicated by the arrows; and FIGURE 4 is an enlarged sectional view taken substantially along the line 4—4 of FIG. 3 as viewed in the direction indicated by the arrows.

Similar reference characters refer to similar parts throughout the several views of the drawing.

Having reference now to the drawings in detail, the device of the instant invention is generally indicated at 10 and comprises a substantially rectangular deck or base plate 11, upon which is mounted a suitable power unit 12. The deck 11 is supported on a pair of hollow upright rear members 13, which carry rear wheels 14, and a pair of similar hollow upright front members 15 which carry front wheels 16, raising the deck to a substantial height above the ground, sufficient to clear a berry bush.

The device is drawn by a tractor, preferably, or, in the event that it is desired to construct the same as a self-propelled unit, rear wheels 14 can be driven in any desired manner as, for example, by a chain and sprocket drive schematically indicated at 16 in FIG. 1 from a suitable drive shaft 17 driven by the power plant 12. Steering is effected by means of a steering wheel 18 positioned adjacent an operator's seat 19 and through appropriate conventional mechanism 20, turns the front wheels 16.

The primary purpose of the power unit 12 is not, however, for the propulsion of the vehicle but rather to drive a blower or fan 21 which is mounted on deck 11, and which has an outlet 22 connected to an air duct 23. Air duct 23 is provided with a plurality of horizontally disposed outlets 24, 25, 26, and 27 arranged at suitable spaced intervals vertically, and is positioned on one side of the frame, so that it will pass along one side of a row of berry bushes B (see FIG. 2).

The space between front support 15 and rear support 13 on the side of the frame adjacent the duct 23 is closed as by a foraminous screen 30, while the opposite side is also provided with a similar screen 31.

Each of the ducts 24, 25, 26, and 27 can be provided with an appropriate fixed baffle to direct the air in an appropriate direction toward the adjacent row of bushes B. However, it has been found preferable to provide the ducts 24, 25, 26, and 27 with baffles 34, 35, 36, and 37 hinged at their lower portions, as best seen in FIG. 4.

These baffles are adapted to be alternately opened and closed by means of links 38, 39, 40, and 41 which are connected pivotally to an operating lever 44, which in turn is pivoted to an arm 45 which is rotated by means of a rotatable shaft 46 associated with the power plant 12. Upper baffles 34 and 35 are closed by downward movement of lever 44, while baffles 36 and 37 are opened, by means of a reversing link 44a, which is pivoted as at 44b to the side wall of duct 25, one end of arm 44b being connected to lever 44 and at its other end to a continuation of lever arm 44b. Obviously reverse movement of lever 44 will effect an opposite action. The arrangement is thus such that the baffles 34 and 35 are opened while the baffles 36 and 37 are closed, or vice versa, so that a current of air is alternately blown on either the upper or the lower portion of the adjacent bush, thus imparting an air created shaking effect by alternately biasing the upper or lower portion of the bush toward and away from the air ducts. The berries are thus removed from the bush, and blown into a wire tray 50, which is pivotally mounted on supports 51 carried by frame members 52 extending from the opposite side of the vehicle frame. The tray 50 is adapted normally to rest in horizontal position substantially under the portion of the bush from which the berries are blown in order to receive the berries either directly or upon rebound from the screen 31. When the tray or trough is full, it is raised by means of a cord 53 which is extended over a suitable pulley 54 to a reel 55 operated by a crank 56 adjacent the driver's seat 12. Raising of the tray 50 to the dotted line positions will dump the berries contained therein over a guide member 57 into a suitable basket or collection receptacle, as desired.

It should be here pointed out that the important feature of the instant invention is the direction of a pulsating kind of air to the berry bushes.

The upper portion of deck 11 is provided with a suitable rail 60, supported on upright 61 to protect the operator.

From the foregoing it will now be seen that there is herein provided an improved berry picking apparatus which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:
1. An apparatus for picking berries comprising an elevated substantially rectangular base, wheeled front and rear supports on the four corners of said base adapted to elevate the base above the top of a row of berry bushes with the supports straddling the row, a source of power on said base, a blower driven by said source of power, a main vertical duct extending downwardly from said base between the front and rear supports on one side, a plurality of horizontal ducts extending from said main duct, and means carried by said apparatus for ejecting air sequentially from said horizontal ducts.

2. An apparatus for picking berries comprising an elevated substantially rectangular base, wheeled front and rear supports on the four corners of said base adapted to elevate the base above the top of a row of berry bushes with the supports straddling the row, a source of power on said base, a blower driven by said source of power, a main vertical duct extending downwardly from said base between the front and rear supports on one side, a plurality of horizontal ducts extending from said main duct, and means for ejecting air sequentially from said horizontal ducts, said last-mentioned means including baffles carried by each horizontal duct at the mouth thereof.

3. An apparatus for picking berries comprising an elevated substantially rectangular base, wheeled front and rear supports on the four corners of said base adapted to elevate the base above the top of a row of berry bushes with the supports straddling the row, a source of power on said base, a blower driven by said source of power, a main vertical duct extending downwardly from said base between the front and rear supports on one side, a plurality of horizontal ducts extending from said main duct, and means for ejecting air sequentially from said horizontal ducts, said last-mentioned means including baffles carried by each horizontal duct at the mouth thereof, said baffles being pivotally mounted for intermittent sequential opening and closing, and means connected to said source of power effecting said opening and closing.

4. An apparatus for picking berries comprising an elevated substantially rectangular base, wheeled front and rear supports on the four corners of said base adapted to elevate the base above the top of a row of berry bushes with the supports straddling the row, a source of power on said base, a blower driven by said source of power, a main vertical duct extending downwardly from said base between the front and rear supports on one side, a plurality of horizontal ducts extending from said main duct, means for ejecting air sequentially from said horizontal ducts, said last-mentioned means including baffles carried by each horizontal duct at the mouth thereof, said baffles being pivotally mounted for intermittent sequential opening and closing, means connected to said source of power effecting said opening and closing, and a wire screen extending between the front and rear support on each side of said apparatus from said base substantially to ground level.

5. An apparatus for picking berries comprising an elevated substantially rectangular base, wheeled front and rear supports on the four corners of said base adapted to elevate the base above the top of a row of berry bushes with the supports straddling the row, a source of power on said base, a blower driven by said source of power, a main vertical duct extending downwardly from said base between the front and rear supports on one side, a plurality of horizontal ducts extending from said main duct, means for ejecting air sequentially from said horizontal ducts, said last-mentioned means including baffles carried by each horizontal duct at the mouth thereof, said baffles being pivotally mounted for intermittent sequential opening and closing, means connected to said source of power effecting said opening and closing, and a wire screen extending between the front and rear support on each side of said apparatus from said base substantially to ground level, and a wire berry catching basket pivotally mounted on the base of the wire screen opposite said ducts.

References Cited in the file of this patent
UNITED STATES PATENTS

| | | |
|---|---|---|
| 1,711,316 | Higgins | Apr. 30, 1929 |
| 2,660,021 | McDowell | Nov. 24, 1953 |
| 2,929,188 | Talkington | Mar. 22, 1960 |